APERTURE CORRECTION CIRCUIT

Filed Aug. 31, 1964

INVENTOR
JAMES D. BUZAN
by
Mason, Kolehmainen, Rathburn and Wyss
ATTORNEYS

United States Patent Office 3,377,425
Patented Apr. 9, 1968

3,377,425
APERTURE CORRECTION CIRCUIT
James Dale Buzan, Bloomington, Ind., assignor to Sarkes Tarzian, Inc., Bloomington, Ind., a corporation of Indiana
Filed Aug. 31, 1964, Ser. No. 393,308
9 Claims. (Cl. 178—7.1)

ABSTRACT OF THE DISCLOSURE

An aperture correction circuit for television signal generating apparatus in which the high frequency components of video pulses are selectively amplified and are combined with inverted high frequency components which have been slightly delayed and amplified by approximately the same amount as the selected components, to provide video output pulses having relatively steep leading and trailing edges and essentially flat tops.

Figure 1:
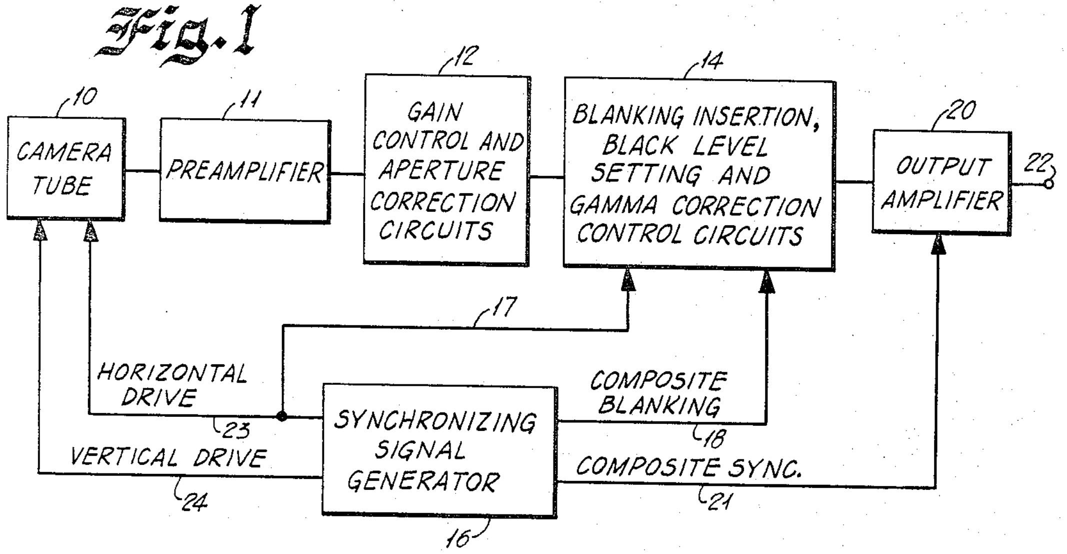

The present invention relates to television signal generating apparatus, and, more particularly, to an aperture correction circuit suitable for use in such apparatus.

In the art of television scanning an effect known as aperture distortion is produced when the scanning beam passes any given picture element. Since the scanning beam has an appreciable width, the resultant video pulses corresponding to abrupt variations from black to white in the picture are not faithfully reproduced. The transitions from black to white and vice versa are broader than the actual elements of the picture, and the corresponding video pulses have rounded top portions and sloping side portions whereas the actual picture element may change abruptly from black to white, remain at a certain value of white for the duration of the element and return abruptly to the same level as before. In a vidicon type television camera tube the video pulses, which should approximate a square wave with steep side portions and a flat top portion, actually have a wave form approximating the upper half of a sinusoidal wave, a condition which obviously prevents sharp definition in contrast in the reproduced picture.

Various circuit arrangements have been heretofore proposed to correct for this aperture distortion. Many of these arrangements have employed delay lines to compensate for this effect and to effectively sharpen or increase the slope of the leading and trailing edges of the video pulses and to flatten the top portions thereof. However, these delay line arrangements function only over a narrow range of frequencies and are expensive to manufacture. Usually the delay line compensation is chosen at a particular frequency, such as 4.5 megacycles, and video pulses which are wider or narrower than those corresponding to this frequency are essentially uncompensated. Also, a simple differentiation circuit, which in some types of pulse work is used to sharpen the pulses, is unsatisfactory for aperture correction because the overshoot pulses of the opposite polarity which are inherently produced by differentiation of a pulse wave form cause undesired white spots following black elements of the picture, or vice versa.

It is, therefore, an object of the present invention to provide a new and improved aperture correction circuit which is effective to provide compensation over a relatively wide band of frequencies.

It is another object of the present invention to provide a new and improved aperture correction circuit which is capable of sharpening pulses over a relatively wide range of pulse widths without introducing any appreciable amount of overshoot in the corrected pulses.

It is a further object of the present invention to provide a new and improved aperture correction circuit which is relatively inexpensive to manufacture and is capable of modifying a video pulse to sharpen the leading and trailing edges thereof and provide a flat top portion therefor over a relatively wide range of pulse widths.

Figure 2:
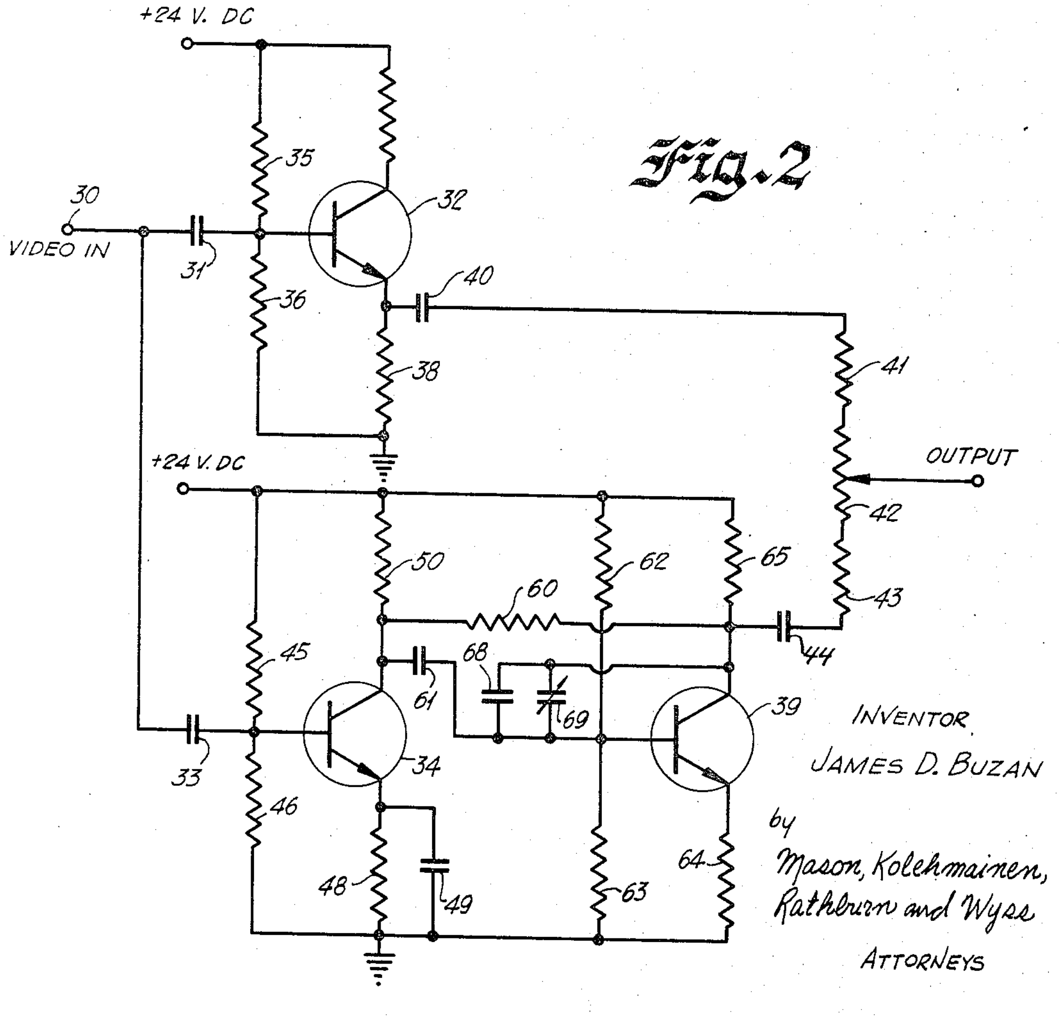

The invention, both as to its organization and method of operation, together with further objects and advantages thereof, will best be understood by reference to the following specification taken in connection with the accompanying drawings in which:

FIG. 1 is a block diagram of a television signal generating system in which the aperture correction circuit of the present invention is employed; and FIG. 2 is a schematic diagram of the aperture correction circuit of the system of FIG. 1.

Referring now to the drawings and more particularly to FIG. 1, the present invention is therein illustrated in connection with signal generating apparatus which comprises generally a camera tube 10, the output of which is connected to a preamplifier 11. The camera tube signal is amplified in the preamplifier 11 and is then supplied to gain control and aperture correction circuits 12. In the circuits 12 the video gain or peak-to-peak amplitude of the video signal may be adjusted by suitable controls and, in accordance with the present invention, there is provided a suitable aperture correction circuit for correcting the waveform of the video pulses over a wide range of frequencies and pulse widths. The corrected video signal is then applied to blanking insertion, black level setting and gamma correction control circuits 14 where the composite blanking signal is inserted into the video signal while providing an accurate and adjustable setting of the black level of the video signal wave relative to the blanking signal. In the circuits 14 there is also provided a correction for the non-linear characteristic of the camera tube 10 and an adjustment is provided for varying the position of the "knee" of the gamma curve.

In order to accomplish these functions, the circuits 14 are supplied with horizontal drive pulses from the main synchronizing signal generator 16 over the conductor 17 and are also provided with a composite blanking signal from the generator 16 by way of the conductor 18. The composite video and blanking signal output of the circuits 14 is supplied to an output amplifier 20 wherein the composite synchronizing signal is superimposed on the blanking pulses. To this end, a composite synchronizing signal is supplied from the generator 16 by way of the conductor 21 to the output amplifier 20. A composite television signal is thus produced at the output terminal 22 of the system of FIG. 1 which is suitable for use in television broadcasting equipment. The synchronizing signal generator 16 provides suitable horizontal drive pulses which are supplied to the camera tube circuits 10 by way of the conductor 24 so that scanning of the camera tube 10 may be effected in a conventional manner. In this connection it will be understood that the camera tube 10 requires certain auxiliary circuits and power supply equipment (not shown), a consideration of which is unecessary to the present invention.

Referring now to FIG. 2 there is therein illustrated the circuit arrangement of the aperture correction circuit 12 of the system of FIG. 1. More particularly, the video output signal from the camera tube 10, which is amplified in the pre-amplifier 11 and has been suitably controlled in gain, is applied to an input terminal 30 and is coupled through a capacitor 31 to the base of a transistor 32 and through a capacitor 33 to the base of a transistor 34. The base of the transistor 32 is suitably biased by means of the resistors 35 and 36 connected between a +24 volt DC supply and ground, and the transistor 32 is operated as an emitter follower so that the video signal applied to the terminal 30 is repeated across the emitter follower resistor 38 without substantial modification.

Correction for aperture distortion is provided by a circuit which includes the transistor 34 and another transistor 39 and the outputs of the transistors 32 and 39 are combined in a circuit which permits a selection of a variable amount of aperture correction. More particularly, the emitter of the transistor 32 is connected through a capacitor 40 in a voltage divider including a resistor 41, a potentiometer 42 and a resistor 43, the bottom end of the resistor 43 being connected through a capacitor 44 to the collector of the transistor 39. In accordance with a feature of the invention the arm of the potentiometer 42 may be adjusted so that a predetermined amount of aperture correction can be selected and combined with an uncorrected signal from the transistor 32 without altering the actual frequency determining constants within the aperture correction circuit itself. Such an arrangement provides a simple and effective way of producing the desired amount of correction without interfering with the circuit constants associated with the transistors 34 and 39 and also permits further modification of the video pulse waveform to provide optimum wave shape.

Considering now the transistors 34 and 39, the base of the transistor 34 is suitably biased by means of the resistors 45 and 46 which are connected between the plus 24 volt terminal and ground. The emitter circuit of the transistor 34 includes a resistor 48 and a capacitor 49 connected in parallel therewith. The collector of the transistor 34 is connected to the plus 24 volt terminal through a resistor 50. The capacitor 49 has a relatively small capacitance value so that the emitter resistor 48 of the transistor 34 becomes more heavily bypassed at the higher frequencies with the result that the high frequency component of the incoming video pulse supplied to the base of the transistor 34 are emphasized in the collector circuit of the transistor 34. Thus, assuming that a positive video pulse is applied to the base of the transistor 34, a negative pulse will be developed at the collector of this transistor and, due to the above-described action of the capacitor 49, there will be included a sharp negative spike in the region of the leading edge of this negative pulse and a sharp positive spike in the region of the trailing edge of this pulse.

The signal appearing at the collector of the transistor 34 is connected directly to the collector of the transistor 39 through a resistor 60. In addition, the signal appearing at the collector of the transistor 34 is coupled through a capacitor 61 to the base of the transistor 39. The base of the transistor 39 is biased by means of a network including the resistors 62 and 63 connected between the +24 volt terminal and ground; the emitter of the transistor 39 is connected to ground through an unbypassed resistor 64, and the collector of this transistor is connected to the +24 volt terminal through a resistor 65. In addition, a feedback circuit is provided between the collector and base of the transistor 39 which comprises a fixed capacitor 68 and a variable capacitor 69 connected in parallel between the collector and base of the transistor 39. Since the signal appearing at the collector of the transistor 34 is coupled to the base of the transistor 39 through the capacitor 61, this signal is amplified and inverted in the transistor 39 to appear at the collector of this transistor in combination with the signal directly coupled from the collector of the transistor 34 to the collector of the transistor 39 through the resistor 60. A further signal path between the collector of the transistor 34 and the collector of the transistor 39 is provided through the capacitors 61 and 68, 69.

The combined or composite signal developed at the collector of the transistor 39 comprises a square wave of the same polarity as the video input pulse but having relative steep leading and trailing edges and an essentially flat top portion. Furthermore, the frequency range over which the aperture correction circuit of the present invention functions to provide an essentially flat-topped steep-sloped square wave is relatively broad. For example, the aperture correction circuit of the present invention provides suitable compensation for video pulses having a width of from .3 microsecond to .048 microsecond.

Considering now the operation of the above-described aperture correction circuit of the present invention, it is pointed out that the operation of this circuit is complex and while the factors discussed hereinafter are considered to be the important ones insofar as an understanding of the invention is concerned, there may well be additional contributing factors involved, it being understood that a specific circuit embodiment is disclosed hereinafter whereby the present invention may be constructed by those skilled in the art.

Assuming that a positive going video pulse is applied to the base electrode of the transistor 34 and assuming further that this positive input pulse has relatively gently sloping leading and trailing edges and a rounded top portion, this input pulse is inverted in the transitsor 34 so as to appear as a negative going pulse in the collector circuit of this transistor. However, due to the high frequency accentuation provided by the small capacitor 49 across the emitter resistor 48, the high frequency components of the input video pulse are amplified to a greater extent than the low frequency components thereof so that a pronounced negative spike is produced during the leading edge portion of the input pulse, and a pronounced positive going spike which extends upwardly beyond the base line of the wave form is produced coincident with the trailing edge of the input pulse. This negative going pulse with the above-described negative and positive spikes is transmitted over a number of paths and with various modifications thereof to the output of the aperture correction circuit which may be considered the collector of the transistor 39. Thus, a first transmission path for this wave form leads directly to the collector of the transistor 39 through the series connected capacitors 61 and 68, 69. Since the capacitors 68, 69 are quite small and the collector impedance to ground is relatively small this transmission path tends to transmit high frequencies more efficiently so that the negative spike produced during the leading edge of the input pulse and the positive spike produced during the trailing edge of the input pulse are passed to the collector without substantial attenuation or alteration. A second transmission path includes the resistor 60 connected between the collectors of the transistors 34 and 39. However, the capacitors 68, 69 are connected from the collector of the transistor 39 to ground through the input or base to ground impedance of this transistor and hence constitute a shunt path to ground. This shunt path tends to reserve the higher frequency components so that only the lower frequency components of the negative going pulse appearing at the collector of the transistor 34 are transmitted to the collector of the transistor 39 through the resistor 60. In addition, the second transmission path produces a slight delay of the waveform supplied to the collector of the transistor 39 over this path. The waveform at the collector of the transistor 34 is also coupled over a third transmission path through the capacitor 61 to the base of the transistor 39 and is amplified in this transistor so as to appear as a positive going pulse at the collector of the transistor 39. The lower frequency components of this positive going pulse are somewhat larger in amplitude than those of the negative going pulse transmitted directly from the collector of the transistor 34 through the resistor 60 to the collector of the transistor 39 with the result that the composite pulse at the collector of the transistor 39 is positive going. However, insofar as the base of the transistor 39 is concerned the capacitors 68 and 69 are in a shunt circuit to ground through the collector impedance of the transistor 39. Accordingly, this shunt circuit provides some integrating and time delay action so that the negative going spike, which is inverted in the transistor 39 and appears as a positive going spike in the collector of the transistor 39, is slightly delayed wtih respect to the negative going spike which is transmitted directly through the capacitors 68, 69 to the collector of the transistor 39. In a similar manner the original positive going spike which is inverted in the transistor 39 and appears as a negative going spike coincident with the trailing edge of the composite pulse appearing at the collector of the transistor 39 is delayed with respect to the original positive going spike transmitted directly through the capacitors 68, 69. The negative feedback produced by the capacitors 68, 69 is also more pronounced at the higher frequencies with the result that the high frequency components are not amplified to as great a degree in the transistor 39 so that the positive spike coincident with the leading edge and the negative going spike coincident with the trailing edge of the pulse developed at the collector of the transistor 39 are of about the same amplitude as the negative spike coincident with the leading edge and the positive spike coincident with the trailing edge which are transmitted through capacitors 68, 69 directly to the collector of the transistor 39. The net effect of the negative spike and delayed positive spike which are produced during the leading edge portion of the original pulse is to sharpen the leading edge of the pulse and square off the first half of the top portion thereof. The net effect of the positive spike and delayed negative spike which are produced during the trailing edge portion of the original pulse is to square off or flatten the last half of the pulse and steepen or sharpen the trailing edge thereof. The resultant aperture corrected pulse is thus an essentially flat top square wave having steep leading and trailing edges.

In order to adjust the aperture correction circuit of the present invention for optimum compensation, a square wave signal generator is applied to the input of the transistor 34, this test square wave having relatively steep leading and trailing edges and a flat top portion and a frequency within the range over which compensation is accomplished by the aperture correction circuit when in use. Since the applied square wave already has steep leading and trailing edges the above-described positive and negative spikes, both delayed and undelayed, will be extremely sharp and will be superimposed on the four corners of the test square wave. Thus, at the leading edge of the output pulse at the collector of the transistor 39 a negative going spike extending below the baseline will be immediately followed by a positive spike extending above the flat top of the output pulses. At the trailing edge of the output pulse a positive going spike extending above the flat top of the output pulse will be immediately followed by a negative spike extending below the baseline. Adjustment of the capacitor 69 is effective to vary the time delay and to some extent the amplitude of the above-described positive and negative spikes at the leading and trailing edges of the output pulse. Accordingly, the capacitor 69 is adjusted so that the negative and positive spikes occurring during the leading edge are of equal amplitude and the positive and negative spikes occurring during the trailing edge are also of equal amplitude. The transistors 34 and 39 will then be properly adjusted so that a rounded video pulse will be modified to provide a square wave output pulse.

By way of example only, the following circuit constants have been found satisfactory in the circuit of FIG. 2.

| | | |
|---|---|---|
| Transistor: | | Type |
| 32 | | 2N706A |
| 34 | | 2N706A |
| 39 | | 2N706A |
| Resistor: | | Ohms |
| 35 | | 33,000 |
| 36 | | 4,700 |
| 38 | | 1,000 |
| 41 | | 12 |
| 43 | | 75 |
| 45 | | 18,000 |

| | | |
|---|---|---|
| Resistor: | | Ohms |
| 46 | | 3,000 |
| 48 | | 330 |
| 50 | | 2,200 |
| 60 | | 750 |
| 62 | | 33,000 |
| 63 | | 4,700 |
| 64 | | 220 |
| 65 | | 3,000 |
| Capacitor: | | |
| 31 | microfarads | 25 |
| 33 | do | 25 |
| 40 | do | 25 |
| 44 | do | 25 |
| 49 | micromicrofarads | 400 |
| 61 | microfarads | 25 |
| 68 | micromicrofarads | 100 |
| 69 | do | 8–50 |

While there has been described what is at present considered to be the preferred embodiment of the present invention, it will be understood that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. In a television system, an aperture correction circuit comprising first and second control devices each having a pair of input electrodes and an output electrode, means for applying a video signal to one input electrode of one of said devices, a biasing network connected to the other input electrode of said one device, an output terminal, means for supplying a signal from the output electrode of said one device to said output terminal, means including a coupling capacitor for supplying a signal from the output electrode of said one device to one input electrode of said other control device, capacitive feedback means connected between the output electrode of said other device and said one input electrode thereof, and means connecting the output electrode of said other device to said output terminal.

2. In a television system, an aperture correction circuit comprising first and second control devices each having a pair of input electrodes and an output electrode, means for applying a video signal to one input electrode of one of said devices, a frequency selective biasing network connected to the other input electrode of said one device, an output terminal, resistance means for supplying a signal from the output electrode of said one device to said output terminal, means including a coupling capacitor for supplying a signal from the output electrode of said one device to one input electrode of said other control device, capacitive feedback means connected between the output electrode of said other device and said one input electrode thereof, and means connecting the output electrode of said other device to said output terminal.

3. In a television system, an aperture correction circuit comprising first and second control devices each having a pair of input electrodes and an output electrode, means for applying a video signal to one input electrode of one of said devices, a biasing network connected to the other input electrode of said one device, said biasing network having an impedance which varies with frequency in such manner that high frequency components are emphasized in the output of said one device, an output terminal, means for supplying a signal from the output electrode of said one device to said output terminal, means including a coupling capacitor for supplying a signal from the output electrode of said one device to one input electrode of said other control device, capacitive feedback means connected between the output electrode of said other device and said one input electrode thereof, and means connecting the output electrode of said other device to said output terminal.

4. In a television system, an aperture correction circuit comprising first and second control devices each having a pair of input electrodes and an output electrode, means for applying a video signal to one input electrode of one of said devices, a biasing network connected to the other input electrode of said one device, said biasing network having an impedance which varies with frequency in such manner that high frequency components are emphasized in the output of said one device, an output terminal, means for supplying a signal from the output electrode of said one device to said output terminal, means including a coupling capacitor for supplying a signal from the output electrode of said one device to one input electrode of said other control device, capacitive feedback means connected between the output electrode of said other device and said one input electrode thereof, means connecting the output electrode of said other device to said output terminal, and means for varying said capacitative feedback means.

5. In a television system, an aperture correction circuit comprising first and second control devices each having a pair of input electrodes and an output electrode, means for applying a video signal to one input electrode of said first device, a biasing network connected to the other input electrode of said first device, said biasing network having an impedance which varies with frequency in such manner that high frequency components are emphasized in the output of said one device, a resistor connected from the output electrode of said first device to the output electrode of said second device, means including a coupling capacitor for supplying a signal from the output electrode of said first device to one input electrode of said second control device, and capacitive feedback means connected between the output electrode of said second device and said one input electrode thereof, whereby the high frequency components of the signal developed at the output electrode of said first device are coupled directly through said coupling capacitor and said capactive feedback means to the output electrode of said second device and these high frequency components are also inverted through said second device and appear at the output electrode of said second device slightly later than said direct coupled high frequency components.

6. A pulse squaring circuit, comprising a source of pulses having gently sloping leading and trailing edge portions, a first amplifier stage, means for supplying said pulse to said first stage, means in said first stage for emphasizing the high frequency components of said pulses, thereby to provide a first pulse component of the same polarity as said pulses during the leading edge portion thereof and a second pulse component of a polarity opposite to said pulses during the trailing edge portion thereof, a second amplifier stage, means for supplying the output of said first stage which includes said first and second pulse components to said second stage, and means including feedback means connected between the output and input of said second amplifier stage to provide in the output of said second stage a third pulse component of a polarity opposite to that of said pulses during the leading edge portion thereof and a fourth pulse component of the same polarity as said pulses during the trailing edge portion thereof.

7. In a television system, a source of video signals which includes pulses of predetermined polarity having relatively rounded top portions and gently sloping side portions, means for modifying said pulses by adding thereto a first pulse component of a polarity opposite to said pulses immediately followed by a second pulse component of the same polarity as said pulses, both said first and second pulse components occurring during the leading edge portion of said pulses, and means for adding to said pulses a third pulse component of a polarity similar to that of said pulses immediately followed by a fourth pulse component of polarity offset to that of said pulses, said third and fourth pulse components both occurring during the trailing edge portion of said pulses, thereby to flatten said top portions and steepen said side portions without adding undesired portions of the opposite polarity thereto.

8. In a television system, a source of video signals which include pulses of predetermined polarity having a relatively wide range of pulse widths and having relatively rounded top portions and gently sloping side portions, means for selectively amplifying the high frequency components of said pulses, means for inverting and delaying said selectively amplified high frequency components, and means for combining said selectively amplified high frequency components and said inverted and delayed components with pulses developed by said source to produce composite output pulses having relatively steep sloped side portions and essentially flat topped portions.

9. A television system as set forth in claim 8, wherein there is provided means for adjusting the amplitude of said inverted and delayed components so that said output pulses do not contain undesired portions of the opposite polarity.

References Cited

UNITED STATES PATENTS 2,026,379 12/1935 Farnsworth ---------- 178—6

ROBERT L. GRIFFIN, *Primary Examiner.*

JOHN W. CALDWELL, *Examiner.*

R. L. RICHARDSON, *Assistant Examiner.*